US011566989B2

(12) United States Patent
Watanabe et al.

(10) Patent No.: US 11,566,989 B2
(45) Date of Patent: Jan. 31, 2023

(54) SONIC SPEED MEASUREMENT DEVICE AND ELECTRONIC APPARATUS

(71) Applicant: Seiko Epson Corporation, Tokyo (JP)

(72) Inventors: Ryoki Watanabe, Matsumoto (JP); Kanechika Kiyose, Matsumoto (JP)

(73) Assignee: SEIKO EPSON CORPORATION

( * ) Notice: Subject to any disclaimer, the term of this patent is extended or adjusted under 35 U.S.C. 154(b) by 1003 days.

(21) Appl. No.: 16/291,051

(22) Filed: Mar. 4, 2019

(65) Prior Publication Data

US 2019/0271624 A1 Sep. 5, 2019

(30) Foreign Application Priority Data

Mar. 5, 2018 (JP) .............................. JP2018-038320

(51) Int. Cl.
*G01N 29/024* (2006.01)
*G01N 11/00* (2006.01)
*G01N 29/00* (2006.01)
*G01N 29/44* (2006.01)
*B41J 2/01* (2006.01)

(52) U.S. Cl.
CPC ............... *G01N 11/00* (2013.01); *B41J 2/01* (2013.01); *G01N 29/00* (2013.01); *G01N 29/024* (2013.01); *G01N 29/4427* (2013.01); *G01N 29/4436* (2013.01); *G01N 2011/0073* (2013.01); *G01N 2291/011* (2013.01); *G01N 2291/012* (2013.01); *G01N 2291/0228* (2013.01); *G01N 2291/0258* (2013.01)

(58) Field of Classification Search
CPC ...................................................... G01N 11/00
USPC ................................................... 73/54.41
See application file for complete search history.

(56) References Cited

U.S. PATENT DOCUMENTS

2016/0157828 A1* 6/2016 Sumi .................. G01N 29/46
702/189

FOREIGN PATENT DOCUMENTS

| JP | H06-300740 A | 10/1994 |
| JP | 2001-133319 A | 5/2001 |
| JP | 2002-336245 A | 11/2002 |
| JP | 2015-013375 A | 1/2015 |

OTHER PUBLICATIONS

Ri. PE2E Translation of JP 2002336245 A. Published Nov. 2002. Accessed Feb. 2022. (Year: 2016).*

* cited by examiner

*Primary Examiner* — Walter L Lindsay, Jr.
*Assistant Examiner* — Philipmarcus T Fadul
(74) *Attorney, Agent, or Firm* — Harness, Dickey & Pierce, P.L.C.

(57) ABSTRACT

A sonic speed measurement device includes a reception array in which a plurality of reception elements which output reception signals in response to reception of an ultrasonic wave are disposed in one direction, a phase difference detection portion that detects a phase difference between the reception signals output from the reception elements adjacent to each other in a case where the plurality of reception elements receive the ultrasonic wave which propagates in a spherical wave shape from a target point, and a sonic speed calculation portion that calculates a sonic speed of the ultrasonic wave on the basis of the phase difference.

17 Claims, 13 Drawing Sheets

FIG. 6
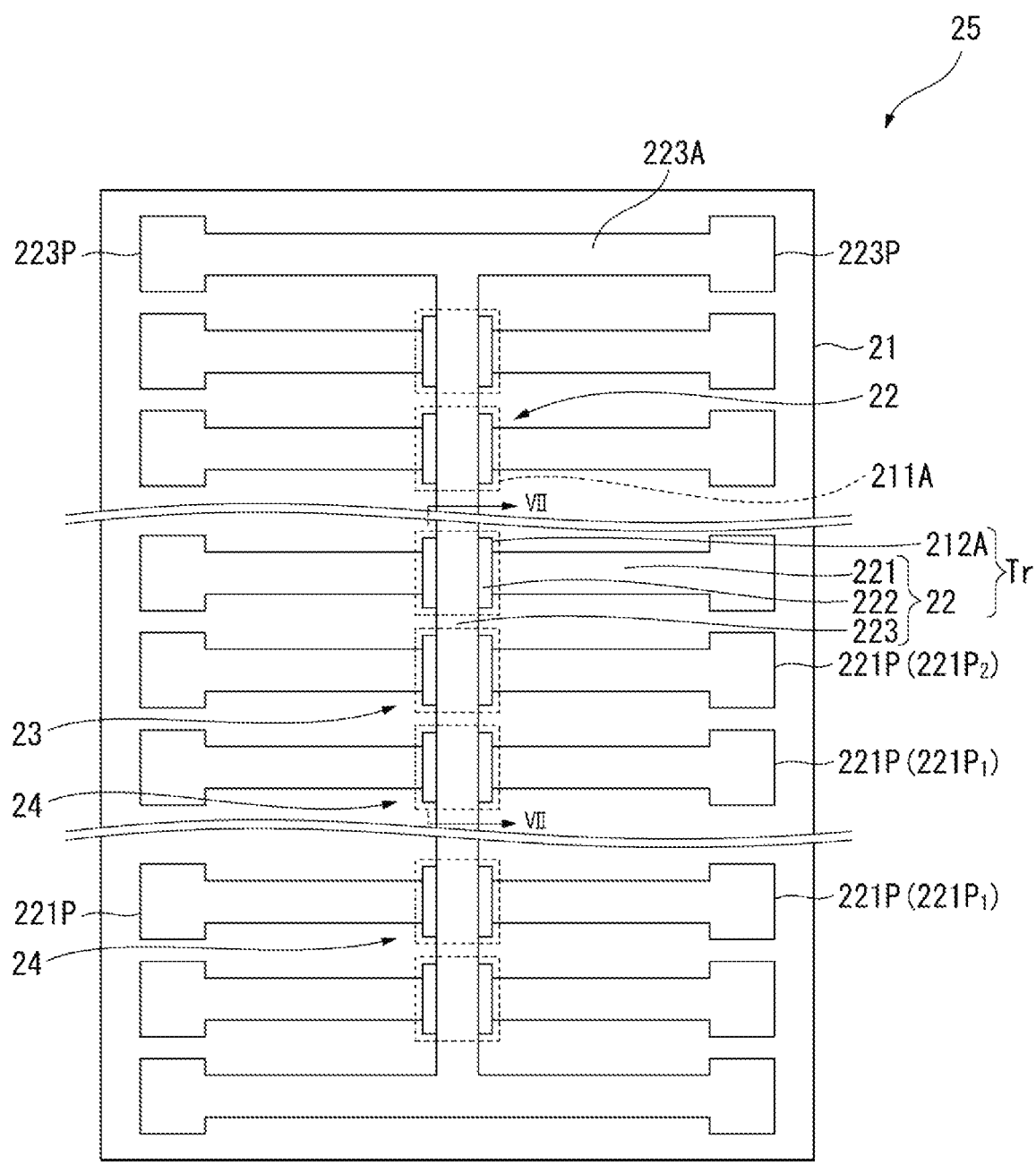
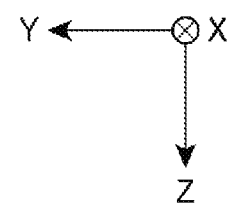

FIG. 7
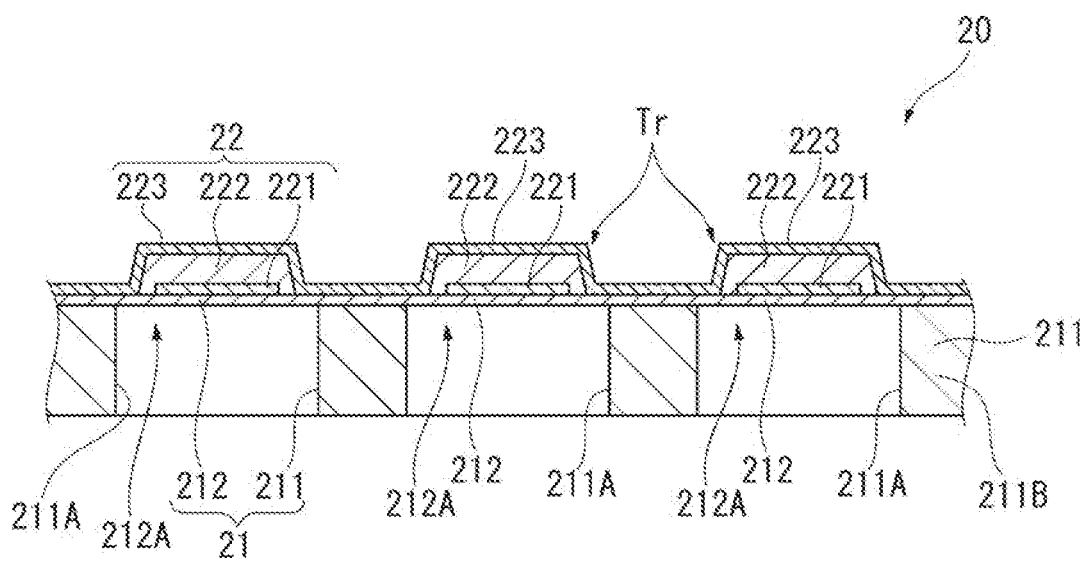
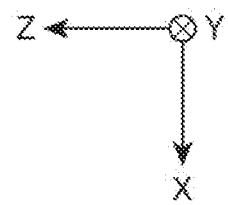

SONIC SPEED MEASUREMENT DEVICE AND ELECTRONIC APPARATUS

BACKGROUND

1. Technical Field

The present invention relates to a sonic speed measurement device and an electronic apparatus.

2. Related Art

In the related art, an ink tank (for example, an ink cartridge) for supplying ink is attached to an ink jet printer. A physical property such as an ink concentration in the ink tank changes over time due to solvent volatilization or pigment precipitation. An ink concentration in the ink tank may differ due to a difference between bulk before and after the ink tank is replaced.

In contrast, there is a liquid droplet ejection apparatus in which unevenness of an ink concentration due to ink precipitation in an ink cartridge is improved (for example, refer to JP-A-2015-13375). The liquid droplet ejection apparatus includes a rotational movement mechanism which rotationally moves a cartridge holder holding the ink cartridge. The ink in the ink cartridge is stirred by rotationally moving the cartridge holder, and thus the ink precipitation is suppressed.

On the other hand, in JP-A-2015-13375, it cannot be detected whether or not the ink concentration is even, and thus a timing of stirring the ink cannot be determined. Since the ink is stirred every time before the liquid droplet ejection apparatus performs a process of ejecting liquid droplets (that is, an image is printed on a target object), ink concentration unevenness can be suppressed, but a process related to printing is complex.

In contrast, there is a device which measures a physical property of a liquid by transmitting an ultrasonic wave to a liquid such as ink and by measuring a sonic speed of the ultrasonic wave which propagates through the liquid (for example, refer to JP-A-2001-133319). In JP-A-2001-133319, a relationship between the viscosity of ink and a sonic speed of an ultrasonic wave propagating through the ink is measured in advance, and the viscosity of the ink is calculated by measuring a sonic speed of an ultrasonic wave.

In JP-A-2001-133319, an ultrasonic wave is output to a first reflection surface and a second reflection surface which are provided to have a step difference, pulse signals reflected at the respective reflection surfaces are received, and a sonic speed of the ultrasonic wave propagating through a liquid is measured on the basis of a time difference (phase difference) between a pulse signal reflected at the first reflection surface and a pulse signal reflected at the second reflection surface.

In this case, the pulse signal reflected at the first reflection surface and the pulse signal reflected at the second reflection surface are required to be accurately received, but the received pulse signals include signals which are reflected at an edge of the step difference and are multiply reflected in an ink cartridge. Thus, there is a problem in that a pulse signal reflected at each reflection surface cannot be accurately received, and there is an error in a measured sonic speed.

SUMMARY

An advantage of some aspects of the invention is to provide a sonic speed measurement device and an electronic apparatus capable of accurately measuring a sonic speed of an ultrasonic wave.

A sonic speed measurement device according to an application example of the invention includes a reception array in which a plurality of reception elements which output reception signals in response to reception of an ultrasonic wave are arranged in one direction; a phase difference detection portion that detects a phase difference between the reception signals output from the reception elements adjacent to each other in a case where the plurality of reception elements receive the ultrasonic wave which propagates in a spherical wave shape from a target point; and a sonic speed calculation portion that calculates a sonic speed of the ultrasonic wave on the basis of the phase difference.

In this application example, in a case where an ultrasonic wave propagating in a spherical wave shape from the target point is received by the reception array, reception signals are sequentially output from the reception element disposed at a position closest to the target point. In other words, a phase difference is generated in the reception signals output from the respective reception elements. The phase difference detection portion detects the phase difference, and the sonic speed calculation portion calculates a sonic speed on the basis of the detected phase difference.

In other words, in the application example, a single ultrasonic wave output from the target point is received by the respective reception elements, and thus a phase difference can be generated in reception signals output from the respective reception elements. Thus, since the phase difference is generated in the reception signals, it is not necessary to provide a plurality of reflection surfaces, and edges (for example, a step difference between the reflection surfaces) of the respective reflection surfaces are not formed. Therefore, it is possible to prevent a problem that ultrasonic waves reflected at the edges in multiple directions are received by the reception elements, and thus to accurately calculate a sonic speed of an ultrasonic wave.

In the sonic speed measurement device according to the application example, it is preferable that the phase difference detection portion calculates an addition value by deviating the reception signals output from the reception elements adjacent to each other by a predetermined phase shift amount and adding the reception signals together, and detects the phase shift amount in which the addition value is the maximum, as the phase difference.

In the application example with this configuration, the phase difference detection portion performs the phasing addition process in which reception signals from a plurality of respective reception elements arranged in one direction are sequentially deviated by an identical phase difference and are added together, and thus detects a phase difference. For example, there is an aspect in which, in a first reception element to a third reception element arranged in one direction, an ultrasonic wave is received in order from the first reception element, and a first reception signal to a third reception signal are sequentially output. In this case, the phase difference detection portion adds the second reception signal of which a phase is deviated by a phase shift amount with respect to the first reception signal and the third reception signal of which a phase is deviated by the phase shift amount with respect to the second reception signal. The phase difference detection portion detects, as a phase difference, the phase shift amount in which an addition value is the maximum value, by changing the phase shift amount. Consequently, a phase difference can be easily obtained on the basis of a single signal obtained through phasing addition, and thus a circuit configuration can be made small-sized, for example, even in a case where a phase difference is obtained by a phasing addition circuit. Since a signal obtained through phasing addition is used, even if a signal value of each reception signal is small, a phase difference can be detected with high accuracy.

In the sonic speed measurement device according to the application example, it is preferable that in a case where an addition value is calculated by deviating the reception signals output from the reception elements adjacent to each other by a predetermined phase shift amount and adding the reception signals together, the phase difference detection portion calculates the phase shift amount in which the addition value is the maximum, for each of the plurality of reception elements, and detects a representative value of the plurality of phase shift amounts as the phase difference.

Here, a representative value of phase differences may be, for example, an average value or the most frequent value of detected phase differences. In the application example with this configuration, in a case where reception signals output from the reception elements adjacent to each other are added together, the phase difference detection portion calculates the phase shift amount in which the addition value is the maximum, for each of the plurality of reception elements arranged in one direction. For example, in a first reception element to a fourth reception element arranged in one direction, an ultrasonic wave is received in order from the first reception element, and a first reception signal to a fourth reception signal are sequentially output. Here, it is assumed that, in a case where the second reception signal of which a phase is deviated by a phase shift amount with respect to the first reception signal, the third reception signal of which a phase is deviated by a second phase shift amount with respect to the second reception signal, the fourth reception signal of which a phase is deviated by a third phase shift amount with respect to the third reception signal are added, an addition value is the maximum value. In this case, the phase difference detection portion detects a representative value of the first phase shift amount, the second phase shift amount, and the third phase shift amount, as a phase difference.

In the application example with the configuration described above, the phase difference detection portion detects, as a phase difference, a representative value of phase shift amounts calculated such that an addition value is the maximum value for the respective reception elements, and thus it is possible to reduce a detection error and also to accurately calculate a sonic speed.

In the sonic speed measurement device according to the application example, it is preferable that the reception array is provided on a first side surface part of a container which has a bottom surface part, the first side surface part standing on the bottom surface part, and a second side surface part standing on the bottom surface part and facing the first side surface part, and is able to store a fluid in a space surrounded by the bottom surface part, the first side surface part, and the second side surface part, and the target point is provided at a position facing the reception array on the second side surface part.

In the application example with this configuration, the reception array is provided on the first side surface part of the container storing a fluid, and the target point is provided at a position facing the reception array on the second side surface part. In this configuration, it is possible to easily measure a sonic speed of an ultrasonic wave propagating through a fluid between the first side surface part and the second side surface part.

It is preferable that the sonic speed measurement device according to the application example further includes a transmission element that is provided on the first side surface part and transmits an ultrasonic wave toward the target point on the second side surface part.

In the application example with this configuration, since the transmission element is provided on the first side surface part, in a case where an ultrasonic wave is output from the transmission element, the ultrasonic wave reaching the target point is reflected in a spherical wave shape so as to be received by the reception array. Therefore, the ultrasonic wave is received by each reception element at a delay time proportional to a distance from the target point, a phase difference is generated in respective reception signals, and thus the sonic speed can be obtained by detecting the phase difference.

In the sonic speed measurement device according to the application example, it is preferable that the transmission element is provided at the center of the reception array.

In the application example with this configuration, the transmission element is provided at the center of the reception array. In this case, then an ultrasonic wave is transmitted from the transmission element, the target point at which the ultrasonic wave initially arrives is located at a position corresponding to the center of the reception array. Therefore, a distance of the ultrasonic wave propagating to each reception element can be minimized, and thus it is possible to prevent the ultrasonic wave from being attenuated during propagating. Therefore, a signal value of a reception signal output from each reception element is increased, and thus a phase difference can be detected with high accuracy such that the sonic speed of an ultrasonic wave can also be calculated with high accuracy.

In the sonic speed measurement device according to the application example, it is preferable that the target point is a protruding tip point of a conical protrusion which protrudes toward the first side surface part from the second side surface part.

In the application example with this configuration, the target point is the protruding tip point of the protrusion which protrudes toward the first side surface part from the second side surface part. In this configuration, in a case where an ultrasonic wave is transmitted from the transmission element on the first side surface part side, the ultrasonic wave initially can reach the target point which is the protruding tip point of the protrusion, and the ultrasonic wave can be reflected at the protruding tip point in a spherical wave shape. In other words, it is possible to easily obtain an ultrasonic wave propagating in a spherical wave shape from the target point.

It is preferable that the sonic speed measurement device according to the application example further includes a transmission element that is provided at the target point and outputs an ultrasonic wave propagating in a spherical wave shape.

In the application example with this configuration, since the transmission element which outputs an ultrasonic wave propagating in a spherical wave shape is provided at the target point, sound pressure of an ultrasonic wave reaching the reception array increases, and thus a signal value of each reception signal also increases, compared with a case where an ultrasonic wave is reflected at the target point. Consequently, it is possible to accurately detect a phase difference and thus to calculate a sonic speed of an ultrasonic wave with high accuracy.

In the sonic speed measurement device according to the application example, it is preferable that a plurality of the reception arrays are provided at a predetermined interval in a direction of being separated from the bottom surface part on the first side surface part, and the target point is provided at a position facing each of the reception arrays on the second side surface part.

In the application example with this configuration, the plural reception arrays are provided on the first side surface part at a predetermined interval in the direction of being separated from the bottom surface part, and the target point is provided at the position facing each of the reception arrays on the second side surface part. Thus, in the container, it is possible to measure a sonic speed of an ultrasonic wave propagating through a fluid at locations disposed at a predetermined interval from the bottom surface part.

An electronic apparatus according to an application example of the invention includes the sonic speed measurement device; and a controller that controls the sonic speed measurement device.

The electronic apparatus according to the application example of the invention includes the above-described sonic speed measurement device. Therefore, it is possible to accurately measure a sonic speed of an ultrasonic wave by using the sonic speed measurement device, and thus to perform highly accurate control with the electronic apparatus.

It is preferable that the electronic apparatus according to the application example further includes a container that has a bottom surface part, a first side surface part standing on the bottom surface part, and a second side surface part standing on the bottom surface part and facing the first side surface part via a fluid, in which the reception array is provided on the first side surface part, and the target point is provided at a position facing the reception array on the second side surface part, and the controller compares the sonic speed calculated by the sonic speed calculation portion with a predetermined reference value, so as to determine the quality of the fluid.

The electronic apparatus according to the application example with this configuration includes the container in which the reception array and the target point facing each other via the fluid, and the controller compares the sonic speed calculated by the sonic speed calculation portion with a predetermined reference value, so as to determine the quality of the fluid. Therefore, it is possible to accurately measure a sonic speed of an ultrasonic wave propagating through the fluid stored in the container, and thus to accurately determine the quality of the fluid by comparing the measured sonic speed with the reference value.

BRIEF DESCRIPTION OF THE DRAWINGS

The invention will be described with reference to the accompanying drawings, wherein like numbers reference like elements.

FIG. 6 is a plan view illustrating a schematic configuration of an ultrasonic sensor of the first embodiment.

FIG. 7 is a sectional view illustrating a part of the ultrasonic sensor of the first embodiment.

DESCRIPTION OF EXEMPLARY EMBODIMENTS

First Embodiment

Hereinafter, a description will be made of a first embodiment of the invention. A description will be made of a printer which is an electronic apparatus into which a sonic speed measurement device to which the invention is applied is incorporated.

Schematic Configuration of Printer 10

Figure 1:
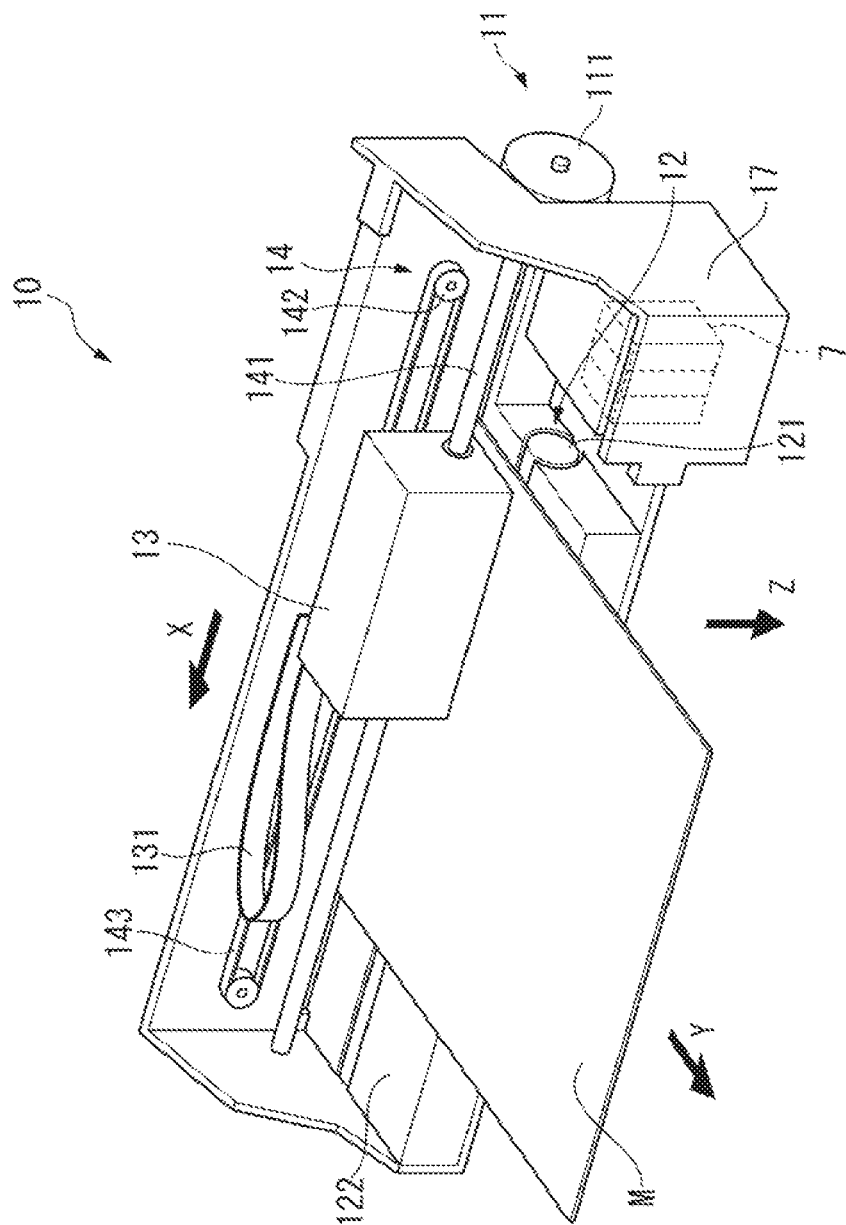
FIG. 1 is a diagram illustrating a configuration example of an exterior of a printer (electronic apparatus) of a first embodiment.
Figure 2:
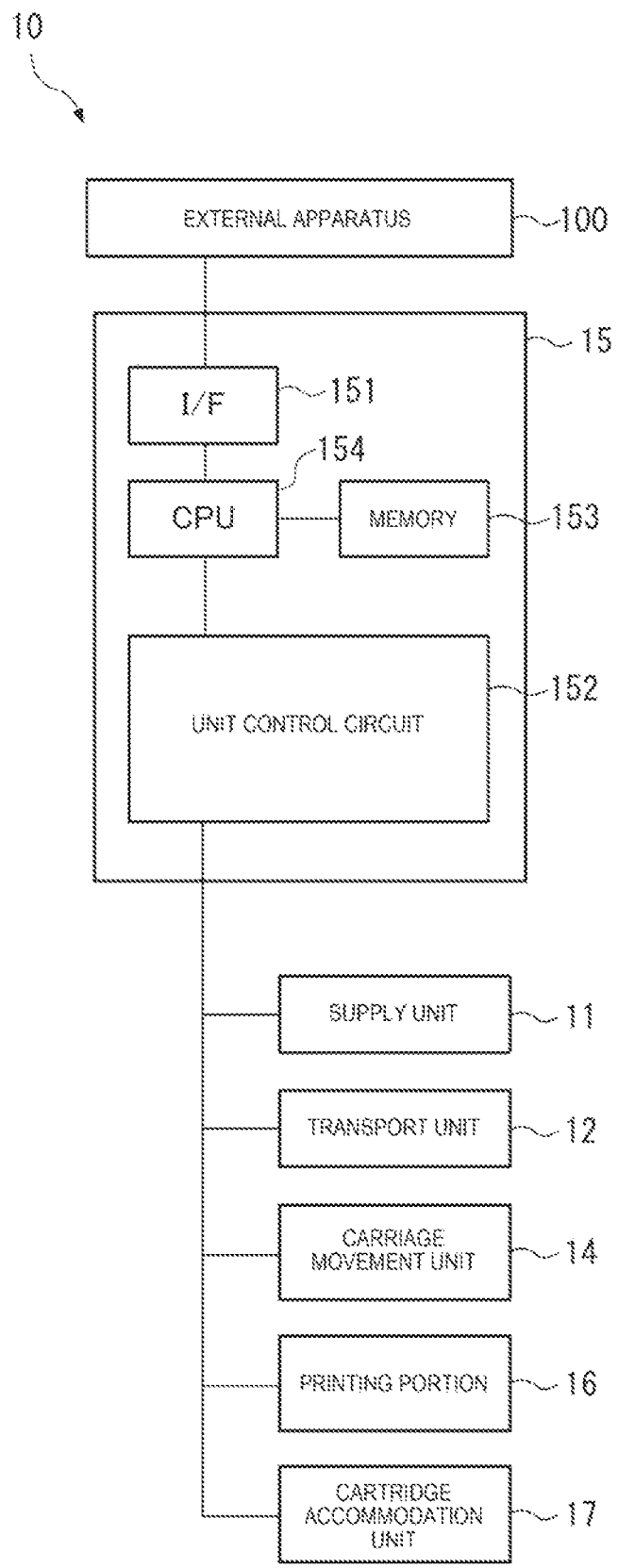
FIG. 2 is a block diagram illustrating a schematic configuration of the printer of the first embodiment.

FIG. 1 is a diagram illustrating a configuration example of an exterior of a printer 10 of the present embodiment. FIG. 2 is a block diagram illustrating a schematic configuration of the printer 10 of the present embodiment.

As illustrated in FIG. 1, the printer 10 includes a supply unit 11, a transport unit 12, a carriage 13, a carriage movement unit 14, a control unit 15 (refer to FIG. 2), and a cartridge accommodation unit 17.

The printer 10 controls the respective units 11, 12, and 14 and the carriage 13 so as to print an image on a medium M on the basis of printing data which is input from an external apparatus 100 such as a personal computer.

The supply unit 11 is a unit which supplies the medium M as an image formation target to an image formation position. The supply unit 11 includes, for example, a roll member 111 (refer to FIG. 1) on which the medium M is wound, a roll drive motor (not illustrated), and a roll drive gear train (not illustrated). The roll drive motor is driven to be rotated on the basis of a command from the control unit 15, so that the roll member 111 is rotated via the roll drive gear train, and thus a paper surface wound on the roll member 111 is supplied to a downstream side in a sub-scanning direction.

In the present embodiment, an example of supplying a paper surface wound on the roll member 111 is described, but this is only an example. For example, the medium M may be supplied according to any supply method, for example, a method of supplying the medium M such as paper surfaces stacked in a tray or the like one by one.

The transport unit 12 transports the medium M supplied from the supply unit 11, along a Y direction. The transport unit 12 is configured to include, for example, a transport roller 121, a driven roller (not illustrated) which is disposed to pinch the medium M with the transport roller 121 and follows the transport roller 121, and a platen 122.

The transport roller 121 is rotated as a result of a transport motor (not illustrated) being driven under the control of the control unit 15, and transports the medium M in the Y direction in a state of pinching the medium M with the driven roller.

The carriage 13 is mounted with a printing portion 16 which prints an image by ejecting ink 70 (refer to FIG. 4) onto the medium M. The printing portion 16 performs a printing process (an image formation process on the medium M) of forming an image on the medium M by individually ejecting the ink 70 onto the medium M at a portion facing the medium M on the basis of a command signal from the control unit 15.

The printing portion 16 is configured to include nozzle units (not illustrated) corresponding to the ink 70 of a plurality of colors, and supply tubes (not illustrated) for supplying the ink 70 to the nozzle units from an ink cartridge 7 which will be described later.

The carriage movement unit 14 reciprocally moves the carriage 13 on the basis of a command from the control unit 15.

As illustrated in FIG. 1, the carriage movement unit 14 is configured to include, for example, a carriage guide shaft 141, a carriage motor 142, and a timing belt 143.

The carriage guide shaft 141 is disposed along an X direction, and both ends thereof are fixed to, for example, a casing of the printer 10. The carriage motor 142 drives the timing belt 143. The timing belt 143 is supported in substantially parallel to the carriage guide shaft 141, and a part of the carriage 13 is fixed thereto. In a case where the carriage motor 142 is driven on the basis of a command from the control unit 15, the timing belt 143 normally and reversely travels, and thus the carriage 13 fixed to the timing belt 143 is guided at the carriage guide shaft 141 so as to be reciprocally moved.

The cartridge accommodation unit 17 accommodates the ink cartridge 7. The printer 10 of the present embodiment supplies the ink 70 in the ink cartridge 7 to the printing portion 16, and forms an image on the medium M. The cartridge accommodation unit 17 is provided with a sonic speed measurement device 1 which measures a sonic speed of an ultrasonic wave propagating through the ink 70 stored in the ink cartridge 7.

Figure 3:
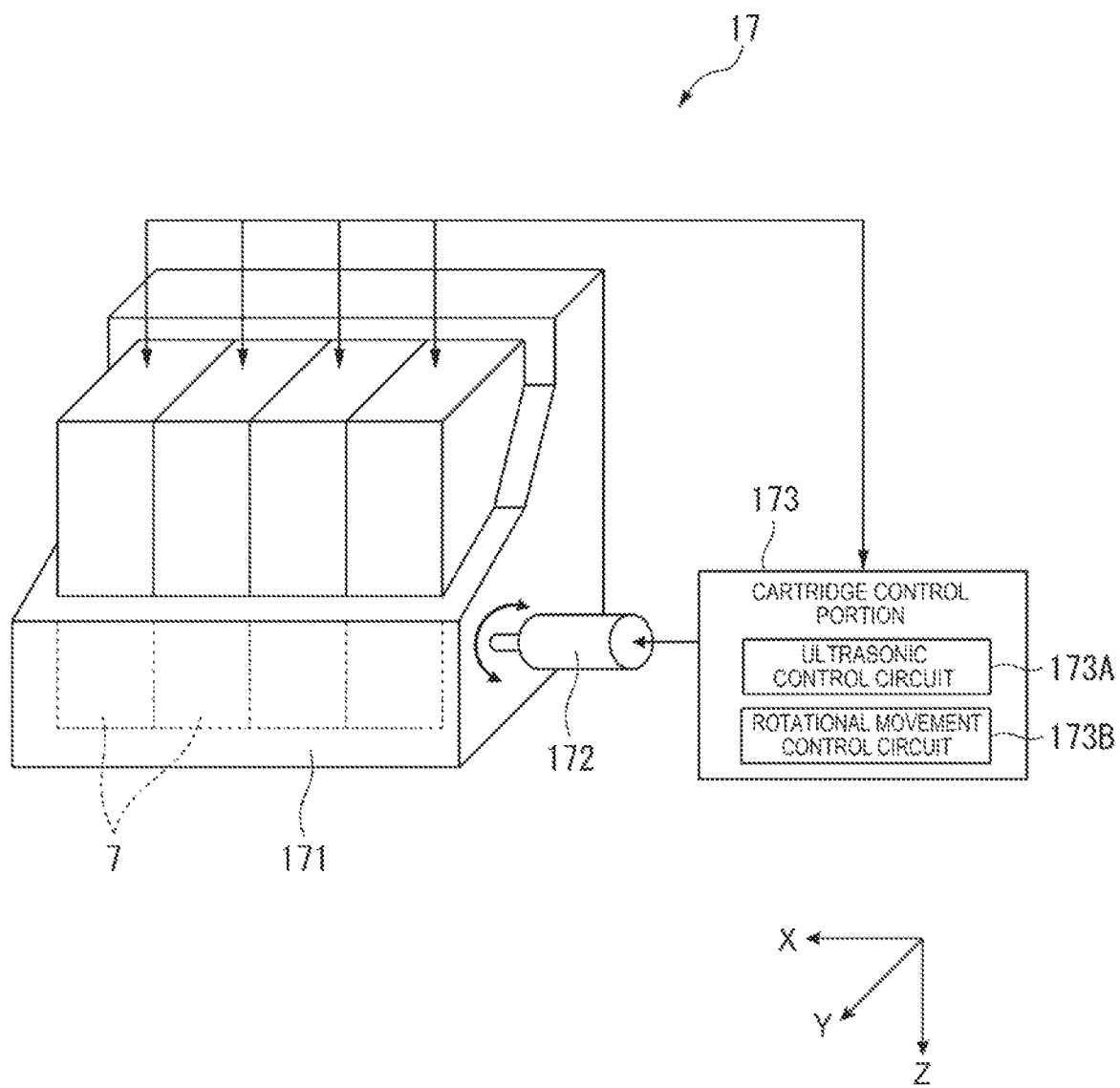
FIG. 3 is a schematic diagram illustrating a schematic cartridge accommodation unit of the printer of the first embodiment.
Figure 4:
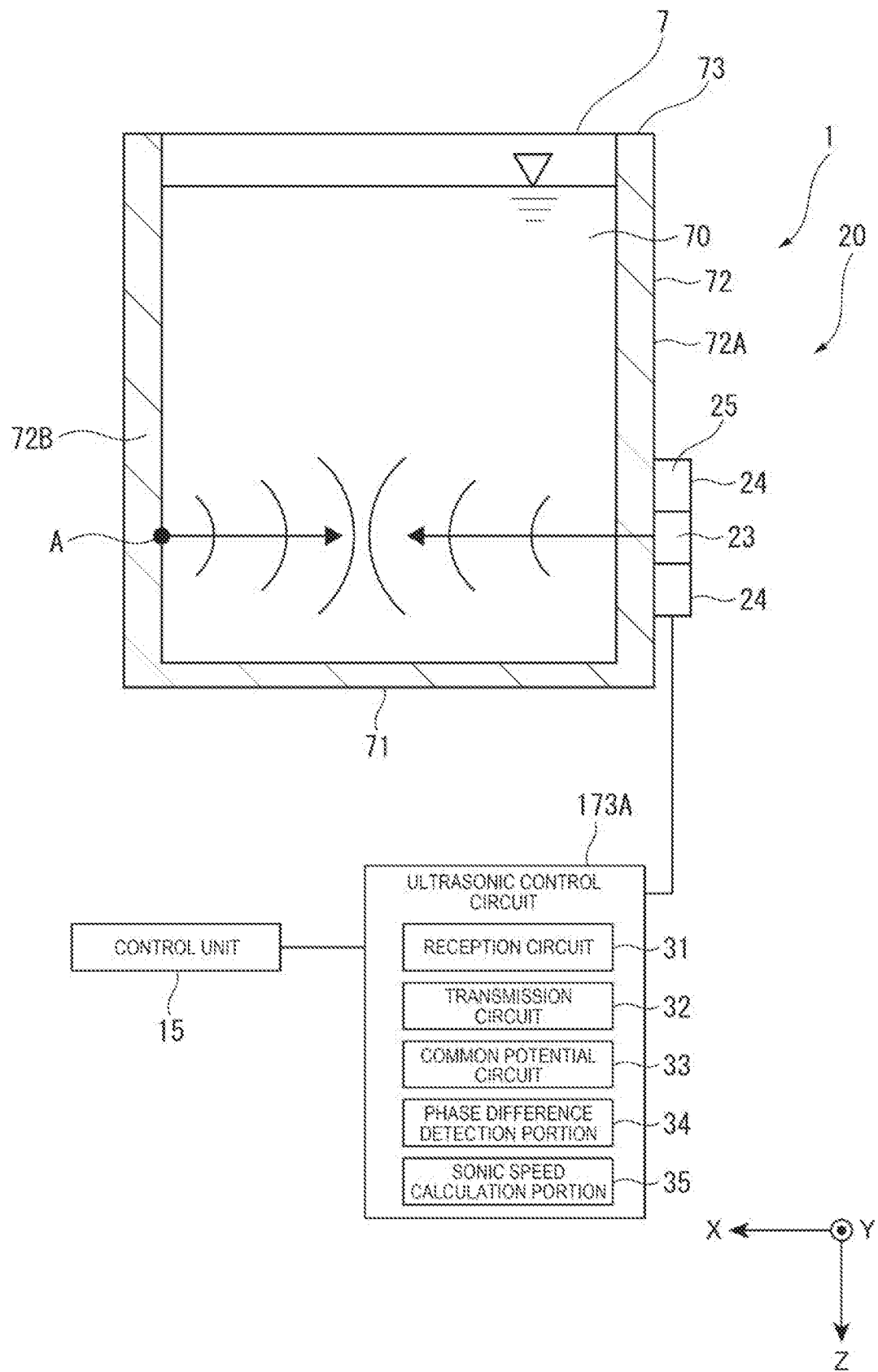
FIG. 4 is a schematic diagram illustrating a schematic sonic speed measurement device of the first embodiment.

FIG. 3 is a schematic diagram illustrating a schematic configuration of the cartridge accommodation unit 17. FIG. 4 is a schematic diagram illustrating a schematic configuration of the sonic speed measurement device 1 provided in the cartridge accommodation unit 17.

As illustrated in FIG. 3, the cartridge accommodation unit 17 includes ink cartridges 7, an accommodation portion 171 accommodating the ink cartridges 7, a rotational movement mechanism 172, and a cartridge control portion 173.

The ink cartridge 7 is a container which can store the ink 70 which is a fluid to which the invention is applied, and a plurality of ink cartridges 7 are provided in correspondence to ink colors. As illustrated in FIG. 4, the ink cartridge 7 is configured to include a bottom surface part 71, a wall portion 72 surrounding the bottom surface part 71, a top surface part 73 opposed to the bottom surface part 71, and the ink 70 as a fluid is stored in a space surrounded by the bottom surface part 71, the wall portion 72, and the top surface part 73. The ink cartridge 7 includes a communication hole (not illustrated) which communicates between the inside and the outside of the ink cartridge 7.

The bottom surface part 71 is a vertically lower side (+Z side) part when the ink cartridge 7 is accommodated in the accommodation portion 171. In the present embodiment, the bottom surface part 71 is formed in, for example, a rectangular shape in a plan view from the Z direction.

The wall portion 72 stands on an outer peripheral edge of the bottom surface part 71, and connects the bottom surface part 71 to the top surface part 73. As illustrated in FIG. 4, the wall portion 72 includes a first side surface part 72A and a second side surface part 72B facing each other in the X direction, and the first side surface part 72A and the second side surface part 72B are provided such that the mutually facing surfaces are parallel to each other. An ultrasonic sensor 20 configuring the sonic speed measurement device 1 is disposed on the first side surface part 72A. A detailed configuration of the ultrasonic sensor 20 will be described later. On the other hand, the second side surface part 72B is a surface which reflects an ultrasonic wave transmitted from the ultrasonic sensor 20, and, in the present embodiment, a point of the second side surface part 72B facing the center of the ultrasonic sensor 20 is a target point A.

In the present embodiment, an example is described in which a direction (width direction) in which the first side surface part 72A faces the second side surface part 72B is the X direction, but this is only an example. For example, in the wall portion 72, parts facing each other in the Y direction may be a first side surface part and a second side surface part.

The accommodation portion 171 is a pedestal accommodating the ink cartridge 7. The accommodation portion 171 is provided with a hollow insertion pin (not illustrated) which is insertable into an insertion hole of the ink cartridge 7, and, in a case where the ink cartridges 7 are attached, the insertion pin is inserted into the ink cartridges 7 from an insertion part. Consequently, the ink 70 in the ink cartridge 7 is supplied to the printing portion 16 from the insertion pin via a tube (not illustrated).

The rotational movement mechanism 172 rotationally moves the ink cartridge 7 in a case where an ink concentration is abnormal due to precipitation of ink particles in the ink cartridge 7. In the present embodiment, as illustrated in FIG. 3, the rotational movement mechanism 172 is connected to the accommodation portion 171, and simultaneously rotationally moves the plurality of ink cartridges 7 accommodated in the accommodation portion 171 by rotationally moving the accommodation portion 171. The rotational movement mechanism 172 may be provided for each of the ink cartridges 7 of respective colors, and, in this case, each ink cartridge 7 is individually rotationally movable by the rotational movement mechanism 172.

Herein, the rotational movement mechanism 172 is described as an example of a configuration for making an ink concentration uniform, but this is only an example. For example, there may be a configuration in which an ink concentration is made uniform by causing the ink cartridge 7 to vibrate or swing in a predetermined direction.

The cartridge control portion 173 is configured to include an ultrasonic control circuit 173A which controls the ultrasonic sensor 20 provided on the outer wall of the first side surface part 72A of the ink cartridge 7, and a rotational movement control circuit 173B which controls the rotational movement mechanism 172.

The ultrasonic control circuit 173A controls the ultrasonic sensor 20 on the basis of a command from the control unit 15, and calculates a sonic speed c of an ultrasonic wave propagating through the ink 70 in the ink cartridge 7.

The rotational movement control circuit 173B rotationally moves the ink cartridge 7 (accommodation portion 171) by controlling the rotational movement mechanism 172 on the basis of a command from the control unit 15.

As illustrated in FIG. 2, the control unit 15 is configured to include an I/F 151, a unit control circuit 152, a memory 153, and a central processing unit (CPU) 154.

The I/F 151 inputs printing data which is input from the external apparatus 100, to the CPU 154.

The unit control circuit 152 includes control circuits which respectively control the supply unit 11, the transport unit 12, the carriage movement unit 14, the printing portion 16, and the cartridge accommodation unit 17, and controls an operation of each unit on the basis of a command signal from the CPU 154. The control circuit for each unit may be provided separately from the control unit 15, and may be connected to the control unit 15.

The memory 153 stores various programs or various pieces of data for controlling an operation of the printer 10. The various pieces of data may include, for example, printing profile data storing an ejection amount of each piece of ink for color data included as printing data, and a reference value for determining the concentration of ink.

Figure 5:
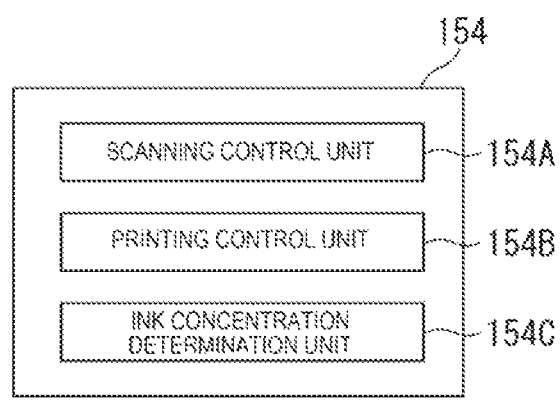
FIG. 5 is a block diagram illustrating a functional configuration of a CPU of the printer of the first embodiment.

FIG. 5 is a block diagram illustrating a functional configuration of the CPU 154.

The CPU 154 reads and executes the various programs stored in the memory 153 so as to function as a scanning control unit 154A, a printing control unit 154B, and an ink concentration determination unit 154C as illustrated in FIG. 5.

The scanning control unit 154A outputs command signals for driving the supply unit 11, the transport unit 12, and the carriage movement unit 14, to the unit control circuit 152. Consequently, the unit control circuit 152 drives the roll drive motor of the supply unit 11 so as to supply the medium M to the transport unit 12. The unit control circuit 152 drives the transport motor of the transport unit 12 so as to transport a predetermined region of the medium M to a position of the platen 122 facing the carriage 13. The unit control circuit 152 drives the carriage motor 142 of the carriage movement unit 14 so as to move the carriage 13.

The printing control unit 154B outputs printing command signals for controlling driving of the supply unit 11, the transport unit 12, the carriage movement unit 14, and the printing portion 16, to the unit control circuit 152, on the basis of, for example, printing data which is input from the external apparatus 100. The unit control circuit 152 outputs a printing control signal to the printing portion 16, so as to eject the ink 70 onto the medium M by driving, for example, a piezoelectric element provided in the nozzle.

The ink concentration determination unit 154C determines whether or not an ink concentration which is the quality of the ink 70 in the ink cartridge 7 which will be described later is a normal value. In a case where it is determined that the concentration of the ink 70 is not a normal value, the ink concentration determination unit 154C controls the rotational movement mechanism 172 to rotationally move the ink cartridge 7 such that the ink concentration is uniform. In a case where the ink concentration is not improved by rotational movement of the ink cartridge 7 a plurality of times, an error message may be displayed on a display or the like (not illustrated), so that a user is prompted to execute maintenance.

Schematic Configuration of Sonic Speed Measurement Device 1

Next, with reference to FIG. 4, a configuration of the sonic speed measurement device 1 will be described.

As illustrated in FIG. 4, the sonic speed measurement device 1 is configured to include the ultrasonic sensor 20 provided in the ink cartridge 7 and the ultrasonic control circuit 173A controlling driving of the ultrasonic sensor 20.

In the sonic speed measurement device 1, the ultrasonic control circuit 173A controls the ultrasonic sensor 20 to cause the ultrasonic sensor 20 disposed on the first side surface part 72A to transmit an ultrasonic wave toward the second side surface part 72B, and to receive the ultrasonic wave (reflected wave) reflected at the second side surface part 72B. The ultrasonic control circuit 173A calculates a sonic speed of the ultrasonic wave propagating through the ink 70 on the basis of a time between a transmission timing of the ultrasonic wave and a reception timing of the ultrasonic wave and a distance between the first side surface part 72A and the second side surface part 72B.

FIG. 6 is a plan view illustrating a schematic configuration of the ultrasonic sensor 20. FIG. 7 is a sectional view of the ultrasonic sensor 20 taken along the line VII-VII in FIG. 6.

As illustrated in FIG. 7, the ultrasonic sensor 20 is configured to include an element substrate 21 and piezoelectric elements 22. In the present embodiment, a substrate thickness direction of the element substrate 21 is the X direction directed from the first side surface part 72A toward the second side surface part 72B.

Configuration of Element Substrate 21

As illustrated in FIG. 7, the element substrate 21 includes a substrate main body portion 211, and a vibration film 212 provided on the −X side of the substrate main body portion 211.

The substrate main body portion 211 is a substrate supporting the vibration film 212, and is configured with a semiconductor substrate such as Si. Here, the element substrate 21 is provided with a plurality of openings 211A which are disposed in a one-dimensional array form along the Z direction as illustrated in FIG. 6 in a plan view viewed from the X direction.

In the present embodiment, each opening 211A is a through-hole which penetrates through the substrate main body portion 211 in the substrate thickness direction (X direction), and the vibration film 212 is provided to close one end side (−X side) of the through-hole.

The vibration film 212 is made of, for example, $SiO_2$ or is configured with a laminate of $SiO_2$ and $ZrO_2$, and is provided on the −X side of the substrate main body portion 211. A thickness dimension of the vibration film 212 is sufficiently smaller than a thickness dimension of the substrate main body portion 211. The vibration film 212 is supported by a wall portion 211B (refer to FIG. 7) of the substrate main body portion 211 configuring the opening 211A, and closes the −X side of the opening 211A. A portion (that is, a region closing the opening 211A) of the vibration film 212 overlapping the opening 211A in a plan view configures a vibration portion 212A. In other words, the opening 211A defines an output edge of the vibration portion 212A of the vibration film 212. The vibration portion 212A is a vibration region which can be caused to vibrate due to the piezoelectric element 22.

Configuration of Piezoelectric Element 22

In the present embodiment, the piezoelectric element 22 is provided at a position overlapping each vibration portion 212A on one surface (a surface on the −X side) of the vibration film 212 in a plan view viewed from the X direction. The piezoelectric element 22 is configured as a result of a first electrode film 221, a piezoelectric film 222, and a second electrode film 223 being laminated in this order on the vibration film 212 as illustrated in FIG. 7.

Specifically, the first electrode film 221 is linearly formed along the Y direction as illustrated in FIG. 6. Both ends (ends ±Y sides) of the first electrode film 221 are first electrode terminals 221P.

The second electrode film 223 is linearly formed along the Z direction. Ends of the second electrode film 223 on ±Z sides are connected to a common electrode line 223A. Both ends (ends on ±Y sides) of the common electrode line 223A are second electrode terminals 223P.

The piezoelectric film 222 is formed of a thin film of a piezoelectric body such as lead zirconate titanate (PZT).

Here, a single ultrasonic transducer Tr is configured with a single vibration portion 212A of the vibration film 212 and the piezoelectric element 22 provided on the vibration portion 212A. Therefore, as illustrated in FIG. 6, in the ultrasonic sensor 20, a plurality of ultrasonic transducers Tr are disposed along the Z direction.

In the ultrasonic sensor 20 of the present embodiment, among the plurality of ultrasonic transducers Tr arranged in the Z direction, the ultrasonic transducer Tr disposed at the center in the Z direction configures a transmission element 23, and the other ultrasonic transducers Tr configure reception elements 24. In other words, the ultrasonic sensor 20 of the present embodiment has a reception array 25 having a one-dimensional structure configured with the plurality of reception elements 24 arranged in the Z direction, and has a configuration in which the transmission element 23 is disposed at the center of the reception array 25 in the Z direction.

In the ultrasonic sensor 20 having such a configuration, a common potential (for example, −3V) is applied to the second electrode terminals 223P. In a case where a drive signal is input to the first electrode terminal 221P (transmission terminal 221P$_2$) connected to the transmission element 23, the piezoelectric film 222 of the transmission element 23 expands and contracts, and the vibration portion 212A of the vibration film 212 provided in the piezoelectric element 22 vibrates at a frequency corresponding to an opening width of the opening 211A. Consequently, an ultrasonic wave is transmitted from the +X side (the opening 211A side) of the vibration portion 212A.

In a case where an ultrasonic wave reflected at the second side surface part 72B reaches the reception element 24, the vibration portion 212A of the reception element 24 vibrates, and a potential difference is generated between the first electrode film 221 and the second electrode film 223 of the piezoelectric element 22. Thus, a reception signal is output from the first electrode terminal 221P connected to the reception element 24 at a reception timing of the ultrasonic wave.

Here, in the present embodiment, an ultrasonic wave transmitted from the transmission element 23 propagates in a spherical wave shape centering on the transmission element 23, and initially reaches a point (target point A) facing the transmission element 23 in the second side surface part 72B. The ultrasonic wave having reached the target point A is reflected at the target point A, but, in this case, the reflected wave also propagates in a spherical wave shape centering on the target point A. Therefore, the ultrasonic wave reflected at the target point A is received from the reception element 24 disposed at a position close to the transmission element 23 to the reception element 24 disposed at a position far away from the transmission element 23 in this order. In other words, a reception signal is initially output from the reception element 24 disposed at the center in the X direction, and then reception signals are output from the reception elements 24 disposed on the ±Z sides with predetermined time delays.

The ultrasonic control circuit 173A which is connected to the ultrasonic sensor 20 controls an operation of the ultrasonic sensor 20, and calculates a sonic speed of an ultrasonic wave propagating through the ink 70 on the basis of a detection signal output from the ultrasonic sensor 20.

Specifically, the ultrasonic control circuit 173A includes, for example, a reception circuit 31, a transmission circuit 32, a common potential circuit 33, a phase difference detection portion 34, and a sonic speed calculation portion 35.

The reception circuit 31 is connected to the first electrode terminal 221P (reception terminal 221P$_1$) of each reception element 24, and receives a reception signal from each reception element 24. The reception circuit 31 is configured to include, for example, a linear noise amplifier and an A/D conversion device, and performs predetermined signal processes on the reception signal which is input from the reception element 24, and then outputs the reception signal to the phase difference detection portion 34.

The transmission circuit 32 is connected to the first electrode terminal 221P (transmission terminal 221P$_2$) of the transmission element 23, and outputs a drive signal to the transmission element 23 on the basis of control of the control unit 15 such that an ultrasonic wave is transmitted from the ultrasonic sensor 20.

The common potential circuit 33 is connected to the second electrode terminals 223P, and causes the second electrode film 223 to have a common potential as described above.

The phase difference detection portion 34 is configured through a combination of a phasing addition circuit, an FPGA, and the like, and detects a phase difference between output signals from the respective reception elements 24, output from the reception circuit 31.

The sonic speed calculation portion 35 is configured with an integrated circuit such as an FPGA, and calculates a sonic speed of the ultrasonic wave propagating through the ink 70 on the basis of the phase difference detected by the phase difference detection portion 34.

There may be a configuration in which a microcomputer is mounted in the ultrasonic control circuit 173A, and the microcomputer functions as a phase difference detection portion or a sonic speed calculation portion by executing a predetermined program.

Ink Measurement Process

Figure 8:
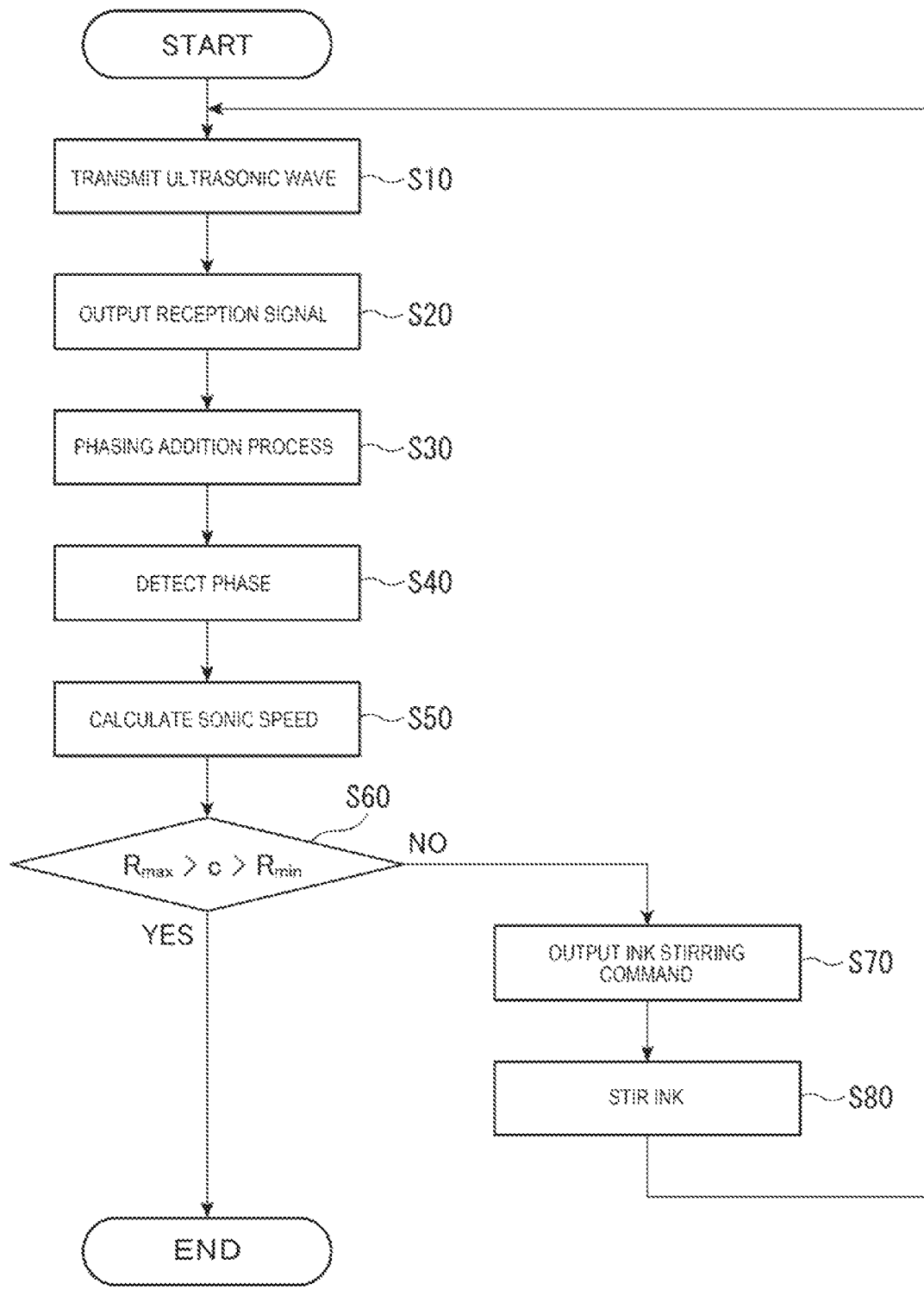
FIG. 8 is a flowchart illustrating an ink measurement process in the printer of the first embodiment.

A description will be made of an ink measurement process of the present embodiment by referring to a flowchart in FIG. 8. The ink measurement method of the present embodiment is performed, for example, when power is supplied to the printer 10, in a case where the ink cartridge 7 is replaced, or a case where an ink measurement execution instruction is received from a user. In the ink measurement process, the ink concentration determination unit 154C outputs a sonic speed measurement command to the sonic speed measurement device 1.

Consequently, the ultrasonic control circuit 173A outputs a drive signal from the transmission circuit 32 to the transmission element 23, and outputs an ultrasonic wave in the X direction from the transmission element 23 (step S10). The ultrasonic wave output from the transmission element 23 propagates in a spherical wave shape in the X direction as illustrated in FIG. 4, and is reflected at the second side surface part 72B facing the first side surface part 72A on which the reception array 25 is disposed. In this case, the ultrasonic wave initially reaches the target point A facing the transmission element 23 which is provided at the center of the reception array 25.

Figure 9:
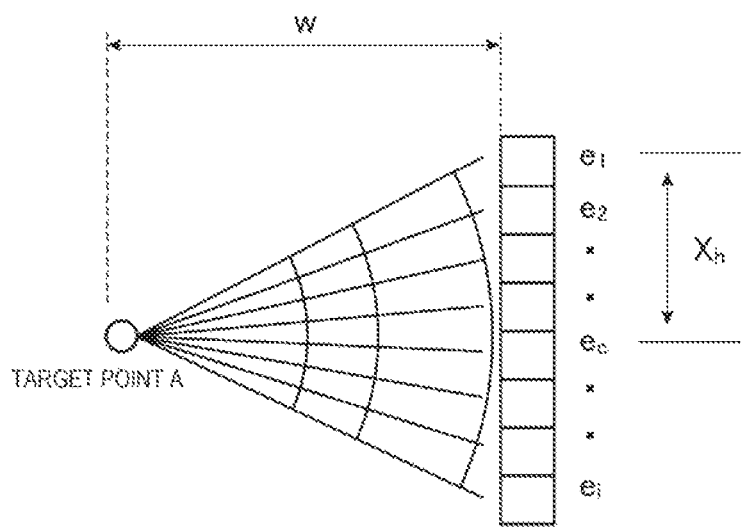
FIG. 9 is a schematic diagram illustrating a state in which an ultrasonic wave in the sonic speed measurement device of the first embodiment propagates.

FIG. 9 is a schematic diagram illustrating a state in which the ultrasonic wave reflected at the target point A propagates in a spherical wave shape.

As illustrated in FIG. 9, the ultrasonic wave reflected at the target point A propagates through the ink 70 in a spherical wave shape centering on the target point A. Here, in the present embodiment, the i reception elements 24 from $e_1$ to $e_i$ are disposed in an array form. The ultrasonic wave reflected at the target point A is received by the respective reception elements 24 from $e_1$ to $e_i$ and the reception element 24 outputs a reception signal corresponding to sound pressure to the reception circuit 31 at a timing of receiving the ultrasonic wave (step S20). In this case, since the respective reception elements 24 are disposed in an array form in the Z direction, the time required for the ultrasonic wave to propagate to each reception element 24 from the target point A differs. Specifically, the reception element 24 disposed at a position (the vicinity of the center $e_c$ of the reception array 25) closest to the transmission element 23 facing the target point A has a relatively short distance from the target point A, and thus the ultrasonic wave reflected at the target point A arrives thereat relatively early. On the other hand, each of the reception elements 24 disposed at both ends of the reception array 25 such as $e_1$ and $e_i$ has a relatively long distance from the target point A, and thus the ultrasonic wave reflected at the target point A arrives thereat relatively late. Thus, a phase difference is generated among reception signals output from the respective reception elements 24.

Referring to FIG. 8 again, after step S20, the phase difference detection portion 34 performs a phasing addition process on the reception signal which is output from each reception element 24 to the reception circuit 31 (step S30).

Figure 10:
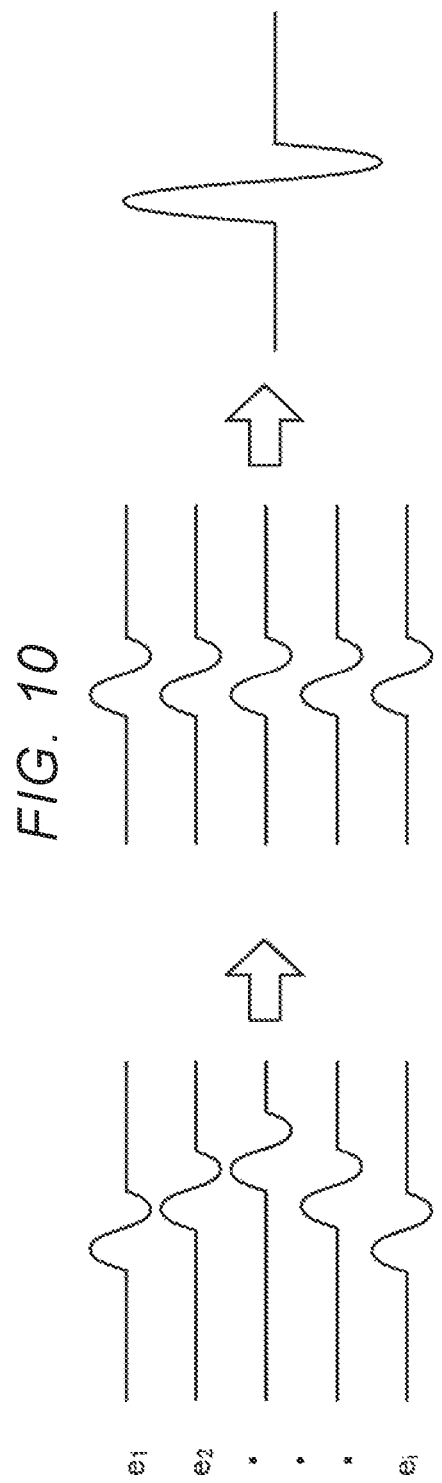
FIG. 10 is a schematic diagram illustrating a phasing addition process in the sonic speed measurement device of the first embodiment.

FIG. 10 is a diagram schematically illustrating a phasing addition process in the present embodiment.

As illustrated in FIG. 10, in the present embodiment, the phase difference detection portion 34 adjusts a phase of the output signal from each reception element 24 such that a signal intensity of an addition signal is the maximum value.

Here, in FIG. 9, a distance between the center coordinate $e_c$ of the reception array 25 and the reception element 24 disposed at $e_i$ on a Z axis is indicated by $X_h$, a distance between the reception array 25 (transmission element 23) and the target point A is indicated by W, and a sonic speed is indicated by c. A time difference (phase difference $t_h$) between the time required for an ultrasonic wave to reach the center coordinate $e_c$ and the time required for the ultrasonic wave to reach the reception element 24 at a position of $e_h$ may be expressed by the following Equation (1).

$$t_h = \frac{\sqrt{X_h^2 + W^2} - W}{c} \quad (1)$$

As shown in the above Equation (1), the phase difference $t_h$ may be expressed as the variable of the sonic speed c. Here, W indicates a distance between the first side surface part 72A and the second side surface part 72B of the ink cartridge 7, and is a known value, and $X_h$ is a known value defined depending on an arrangement interval of the reception elements 24 in the ultrasonic sensor 20. The phase difference $t_h$ is a phase shift amount of each reception signal in a case where a signal value (addition value) of an addition value obtained by adding the respective reception signals together is the maximum value in the phasing addition process. Therefore, in the present embodiment, the phase difference detection portion 34 adjusts a phase shift amount τ when the respective reception signals are added together in the phasing addition process, and detects the phase shift amount τ when a signal intensity (addition value) of an addition signal is the maximum value, as the phase difference $t_h$ (step S40).

For example, in the present embodiment, the ultrasonic transducers Tr are disposed at an equal pitch. Therefore, in a case where an ultrasonic wave propagating in a spherical wave shape from the target point A is received by each reception element 24, a timing of receiving the ultrasonic wave is deviated by the identical phase difference $t_h$ in each reception element 24 disposed on the +Z side from the center coordinate $e_c$ with respect to the reception element 24 adjacent thereto on the −Z side. This is also the same for the reception elements 24 disposed on the −Z side from the center coordinate $e_c$, and a timing of receiving the ultrasonic wave is deviated by the identical phase difference $t_h$ with respect to the reception element 24 adjacent thereto on the +Z side. In other words, in the present embodiment, reception signals output from the adjacent reception elements 24 are output with delay of the identical phase difference $t_h$.

Therefore, in a case where a reception signal output from the reception element 24 at the position of $e_h$ is indicated by $S_{eh}(\theta)$ in the phasing addition process, the phase difference detection portion 34 calculates an addition signal F according to the following Equation (2).

$$\Gamma = \sum_{h=1}^{\frac{i}{2}}\left\{S_h\left(\theta + \frac{i-2h}{2}\tau\right)\right\} + \sum_{h=\frac{i}{2}+1}^{i}\left\{S_h\left(\theta + \frac{2h-i-2}{2}\tau\right)\right\} \quad (2)$$

The phase difference detection portion 34 calculates the phase shift amount τ causing the addition signal Γ to be the maximum in Equation (2), and sets the calculated phase shift amount τ as the phase difference $t_h$.

Thereafter, the sonic speed calculation portion 35 calculates the sonic speed c on the basis of the phase difference $t_h$ by using Equation (1) (step S50).

In the present embodiment, the sonic speed measurement device 1 can calculate a sonic speed of an ultrasonic wave propagating through the ink 70 according to the order.

After step S50, the ink concentration determination unit 154C determines the concentration of the ink 70 on the basis of the sonic speed c (step S60).

Here, the sonic speed c of an ultrasonic wave propagating through a fluid satisfies a relationship of c=(volume modulus/density)$^{0.5}$. In a case where an ink concentration increases, a volume modulus or a density also changes, and thus the sonic speed c of an ultrasonic wave also changes. Here, a volume modulus of a fluid generally has a relation to hardness, and, thus, in a case where a volume modulus increases, a hardness of a substance is heightened. In other words, in a case where the viscosity of a fluid increases, a volume modulus also increases, and thus the sonic speed c increases.

The ink concentration determination unit 154C determines whether or not the sonic speed c is included in a range from an upper limit value Rmax of a reference value to a lower limit value Rmin thereof. The upper limit value Rmax and the lower limit value Rmin are stored in advance in the memory 153. In a case where a determination result is NO in step S60, the concentration of the ink 70 may not be appropriate. In this case, the ink concentration determination unit 154C outputs a control signal for giving an instruction for stirring the ink 70 to the rotational movement control circuit 173B (step S70). Consequently, the ink cartridge 7 is rotationally moved by the rotational movement mechanism 172, and thus the ink 70 is stirred (step S80). The above-described processes are performed, and then the flow returns to step S10.

On the other hand, in a case where a determination result is YES in step S60, the ink measurement process is finished.

In step S60, in a case where a determination result is NO after the ink 70 is stirred a plurality of times by the rotational movement mechanism 172, the ink concentration determination unit 154C may display an error message on a display or the like (not illustrated), so that the user is prompted to execute maintenance.

Advantageous Effect of First Embodiment

In the present embodiment, in a case where an ultrasonic wave propagating in a spherical wave shape from the target point A is received by the reception array 25, reception signals are sequentially output from the reception element 24 disposed at a position closest to the target point A. In other words, a phase difference is generated in the reception signals output from the respective reception elements 24. The phase difference detection portion 34 detects the phase difference, and the sonic speed calculation portion 35 calculates the sonic speed c on the basis of the detected phase difference. In other words, in the present embodiment, a single ultrasonic wave output from the target point A is received by the respective reception elements 24, and thus a phase difference can be generated in reception signals output from the respective reception elements 24. Thus, since the phase difference is generated in the reception signals, it is not necessary to provide a plurality of reflection surfaces, and edges (for example, a step difference between the reflection surfaces) of the respective reflection surfaces are not formed. Therefore, it is possible to prevent a problem that ultrasonic waves reflected at the edges in multiple directions are received by the reception elements 24, and thus to accurately calculate the sonic speed c.

In the present embodiment, the phase difference detection portion 34 performs the phasing addition process in which reception signals from a plurality of respective reception elements 24 arranged in one direction are sequentially deviated by an identical phase difference and are added together. Consequently, a phase difference can be easily obtained on the basis of a single signal obtained through phasing addition, and thus a circuit configuration of the ultrasonic control circuit 173A can be made small-sized. Since the signal obtained through phasing addition is used, even if a signal value of each reception signal is small, a phase difference can be detected with high accuracy.

In the present embodiment, the reception array 25 is provided on the first side surface part 72A of the ink cartridge 7 storing the ink 70, and the target point A is provided at a position of the second side surface part 72B facing the reception array 25. In this configuration, it is possible to easily measure the sonic speed c of an ultrasonic wave propagating through the ink 70 between the first side surface part 72A and the second side surface part 72B.

In the present embodiment, since the transmission element 23 is provided on the first side surface part 72A, in a case where an ultrasonic wave is output from the transmission element 23, the ultrasonic wave reaching the target point A is reflected in a spherical wave shape so as to be received by the reception array 25. Therefore, the ultrasonic wave is received by each reception element 24 at a delay time proportional to a distance from the target point A, a phase difference is generated in respective reception signals, and thus the sonic speed c can be obtained by detecting the phase difference.

In the present embodiment, the transmission element 23 is provided at the center of the reception array 25. In this case, then an ultrasonic wave is transmitted from the transmission element 23, the target point A at which the ultrasonic wave initially arrives is located at a position corresponding to the center of the reception array 25. Therefore, a distance of the ultrasonic wave propagating to each reception element 24 can be minimized, and thus it is possible to prevent the ultrasonic wave from being attenuated during propagating. Therefore, a signal value of a reception signal output from each reception element 24 is increased, and thus a phase difference can be detected with high accuracy such that the sonic speed c of an ultrasonic wave can also be calculated with high accuracy.

In the present embodiment, the printer 10 includes the ink cartridge 7 in which the reception array 25 and the target point A facing each other via the ink 70 are provided, and the ink concentration determination unit 154C of the CPU 154 compares the sonic speed c calculated by the sonic speed calculation portion 35 with the upper limit value Rmax and the lower limit value Rmin of a reference value so as to determine the concentration of the ink 70. Therefore, it is possible to accurately measure the sonic speed c of an ultrasonic wave propagating through the ink 70 stored in the ink cartridge 7, and thus to accurately determine the concentration of the ink 70 by comparing the measured sonic speed c with the reference value.

Second Embodiment

Next, hereinafter, a description will be made of a second embodiment of the invention.

In the first embodiment, a position of the second side surface part 72B facing the transmission element 23 is set as the target point A at which a spherical wave-shaped ultrasonic wave transmitted from the transmission element 23 initially arrives, and the ultrasonic wave is reflected. In contrast, in the present embodiment, there is a difference in that a protrusion 74 protruding toward the reception array 25 side is provided on the second side surface part 72B of the ink cartridge 7, and an ultrasonic wave output from a transmission/reception element 26 is reflected at the protrusion 74. In the following description, the same reference numeral is given to a configuration or a process which has already been described, and description thereof will be omitted or made briefly.

Figure 11:
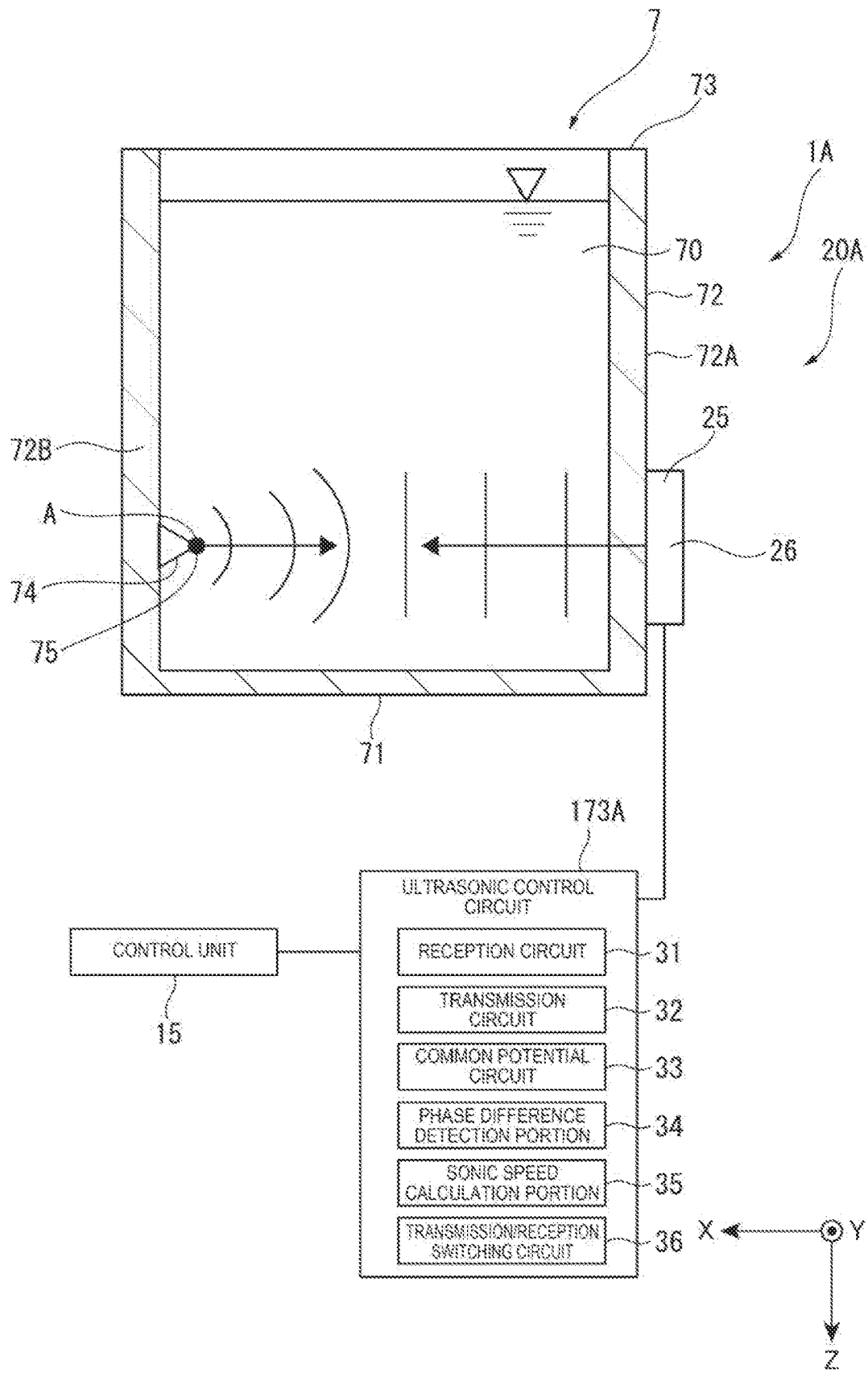
FIG. 11 is a schematic diagram illustrating a schematic sonic speed measurement device of a second embodiment.

FIG. 11 is a schematic diagram illustrating a schematic sonic speed measurement device 1A according to the second embodiment.

In the present embodiment, as illustrated in FIG. 11, an ultrasonic sensor 20A includes a plurality of ultrasonic transducers Tr disposed in the Z direction in the same manner as in the first embodiment. In the present embodiment, each ultrasonic transducer Tr functions as the transmission/reception element 26 which performs transmission and reception of an ultrasonic wave, and the reception array 25 is configured with the transmission/reception elements 26. In other words, the first electrode terminal 221P connected to the transmission/reception element 26 is connected to a transmission/reception switching circuit 36 of the ultrasonic control circuit 173A. The transmission/reception switching circuit 36 is connected to the transmission circuit 32 and the reception circuit 31, and switches each transmission/reception element 26 to either one of a transmission position connected to the transmission circuit 32 and a reception position connected to the reception circuit 31. In other words, in the present embodiment, the transmission/reception element 26 is a reception element and a transmission element to which the invention is applied, and a plurality of transmission/reception elements 26 are disposed in an array form in the Z direction in the reception array 25.

The second side surface part 72B is provided with the protrusion 74 which protrudes toward the reception array 25 side at a position facing the center of the reception array 25. The protrusion 74 is provided in a conical shape of which a front end width is reduced toward the first side surface part 72A from the second side surface part 72B, and a protruding tip point 75 of the protrusion 74 is the target point A. In a case where an ultrasonic wave is transmitted from the first side surface part 72A side, in the protrusion 74, the ultrasonic wave initially reaches the protruding tip point 75 of the protrusion 74 which is the target point A, and a spherical wave-shaped reflected wave is reflected from the target point A toward the first side surface part 72A. In other words, in the first embodiment, an ultrasonic wave reaches the periphery of the target point A right after the ultrasonic wave is reflected in a spherical wave shape at the target point A, and a reflected wave thereof is received by each reception element 24. In this case, an ultrasonic wave initially reaching the reception element 24 is the ultrasonic wave reflected at the target point A, and an ultrasonic wave reflected at a point (located in a normal direction) facing the reception element 24 is also received by the reception element 24.

In contrast, the protrusion 74 is formed such that a distance between the protruding tip point 75 which is the target point A and each of the transmission/reception elements 26 at both ends of the reception array 25 is shorter than a distance between the first side surface part 72A and the second side surface part 72B. Consequently, in the present embodiment, an ultrasonic wave reflected at the protruding tip point 75 of the protrusion 74 is received by each transmission/reception element 26 earlier than an ultrasonic wave reflected at the second side surface part 72B.

Next, with reference to FIG. 11, a description will be made of an operation of transmitting and receiving an ultrasonic wave. In the present embodiment, in step S10, the ultrasonic control circuit 173A switches the transmission/reception switching circuit 36 to a transmission position, so as to connect each transmission/reception element 26 to the transmission circuit 32. Next, a drive signal is simultaneously output to the respective transmission/reception elements 26 from the transmission circuit 32. Consequently, ultrasonic waves are output from the respective transmission/reception elements 26 in the X direction. Then, the ultrasonic waves output from the respective transmission/reception elements 26 strengthen each other, and thus a plane wave which is parallel to a YZ plane propagates toward the X direction. After each transmission/reception element 26 outputs the ultrasonic wave, the ultrasonic control circuit 173A switches the transmission/reception switching circuit 36 to a reception position, so as to connect each transmission/reception element 26 to the reception circuit 31.

In the present embodiment, an example is described in which all of the transmission/reception elements 26 output ultrasonic waves, but this is only an example, and some of the transmission/reception elements 26 may output ultrasonic waves propagating through the ink 70 on a plane. For example, only some of the transmission/reception elements 26 facing the protrusion 74 may output ultrasonic waves. Only a single transmission/reception element 26 disposed at the center of the reception array 25 may transmit an ultrasonic wave. In this case, in the same manner as in the first embodiment, the transmission/reception element 26 disposed at the center may output an ultrasonic wave which propagates through the ink 70 in a spherical wave shape. The ultrasonic wave may initially reach the target point A, and a spherical wave-shaped reflected wave may be reflected at the target point A.

An ultrasonic wave output from the transmission/reception element 26 propagates through the ink 70 in the X direction on a plane, and is reflected at the protruding tip point 75 of the protrusion 74 which is the target point A. The ultrasonic wave reflected at the protrusion 74 propagates through the ink 70 in a spherical wave shape as illustrated in FIG. 11, and is received by the transmission/reception element 26. The transmission/reception element 26 outputs a reception signal corresponding to the received ultrasonic wave to the reception circuit 31.

Therefore, thereafter, the sonic speed c of the ultrasonic wave can be calculated and thus an ink concentration can be determined by using the same process as in the first embodiment.

Advantageous Effect of Second Embodiment

In the present embodiment, the target point A is the protruding tip point 75 of the protrusion 74 which protrudes toward the first side surface part 72A from the second side surface part 72B. In this configuration, in a case where an ultrasonic wave is transmitted from the transmission element 23 on the first side surface part 72A side, the ultrasonic wave initially can reach the target point A which is the protruding tip point 75 of the protrusion 74, and the ultrasonic wave can be reflected at the protruding tip point 75 in a spherical wave shape. In other words, it is possible to easily obtain an ultrasonic wave propagating in a spherical wave shape from the target point A.

Third Embodiment

Next, hereinafter, a description will be made of a third embodiment of the invention.

In the first embodiment, the transmission element 23 is disposed at the center of the reception array 25. In contrast, the present embodiment is different from the first embodiment in that the transmission element 23 is provided on the second side surface part 72B.

Figure 12:
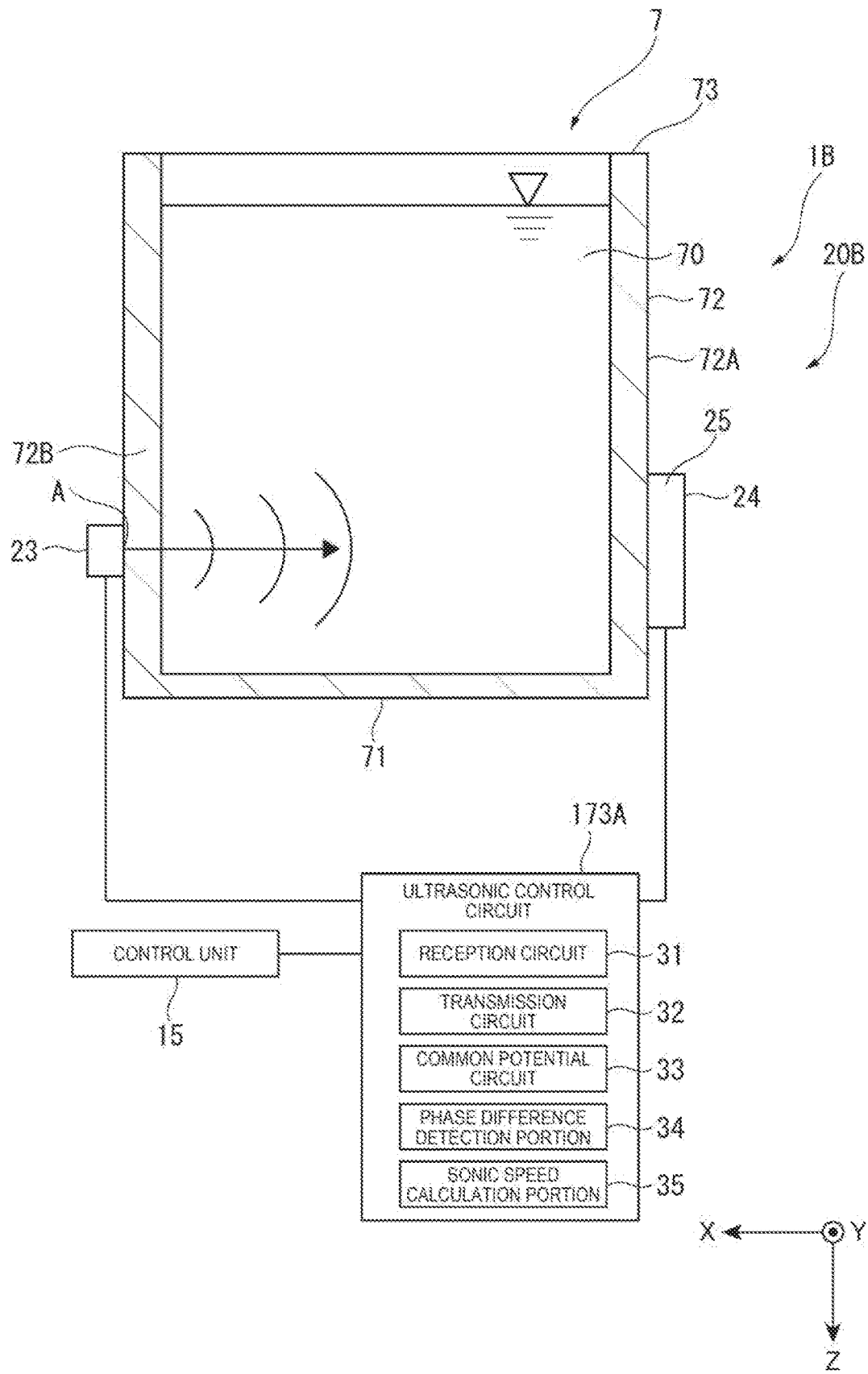
FIG. 12 is a schematic diagram illustrating a schematic sonic speed measurement device of a third embodiment.

FIG. 12 is a schematic diagram illustrating a schematic sonic speed measurement device 1B according to the third embodiment. As illustrated in FIG. 12, in an ultrasonic sensor 20B, the transmission element 23 is provided at a position facing the center of the reception array 25 on the second side surface part 72B. The transmission element 23 outputs an ultrasonic wave which propagates through the ink 70 in a spherical wave shape, in the −X direction. In other words, in the present embodiment, the transmission element 23 is the target point A to which the invention is applied.

In the present embodiment, since the transmission element 23 which outputs an ultrasonic wave propagating in a spherical wave shape is provided at the target point A, sound pressure of an ultrasonic wave reaching the reception array 25 increases, and thus a signal value of each reception signal also increases, compared with a case where an ultrasonic wave is reflected at the target point A. Consequently, it is possible to accurately detect a phase difference and thus to calculate the sonic speed c of an ultrasonic wave with high accuracy.

Fourth Embodiment

Next, hereinafter, a description will be made of a fourth embodiment of the invention.

In the first embodiment, in the ultrasonic sensor 20, the reception array 25 is provided at one location of the first side surface part 72A on the bottom surface part 71 side (+Z side). In contrast, the present embodiment is different from the first embodiment in that the reception array 25 is provided at three locations such as an upper part, a central part, and a lower part of the first side surface part 72A. The present embodiment is different from the first embodiment in that the protrusion 74 is provided at a position facing the reception array 25 on the second side surface part 72B.

Figure 13:
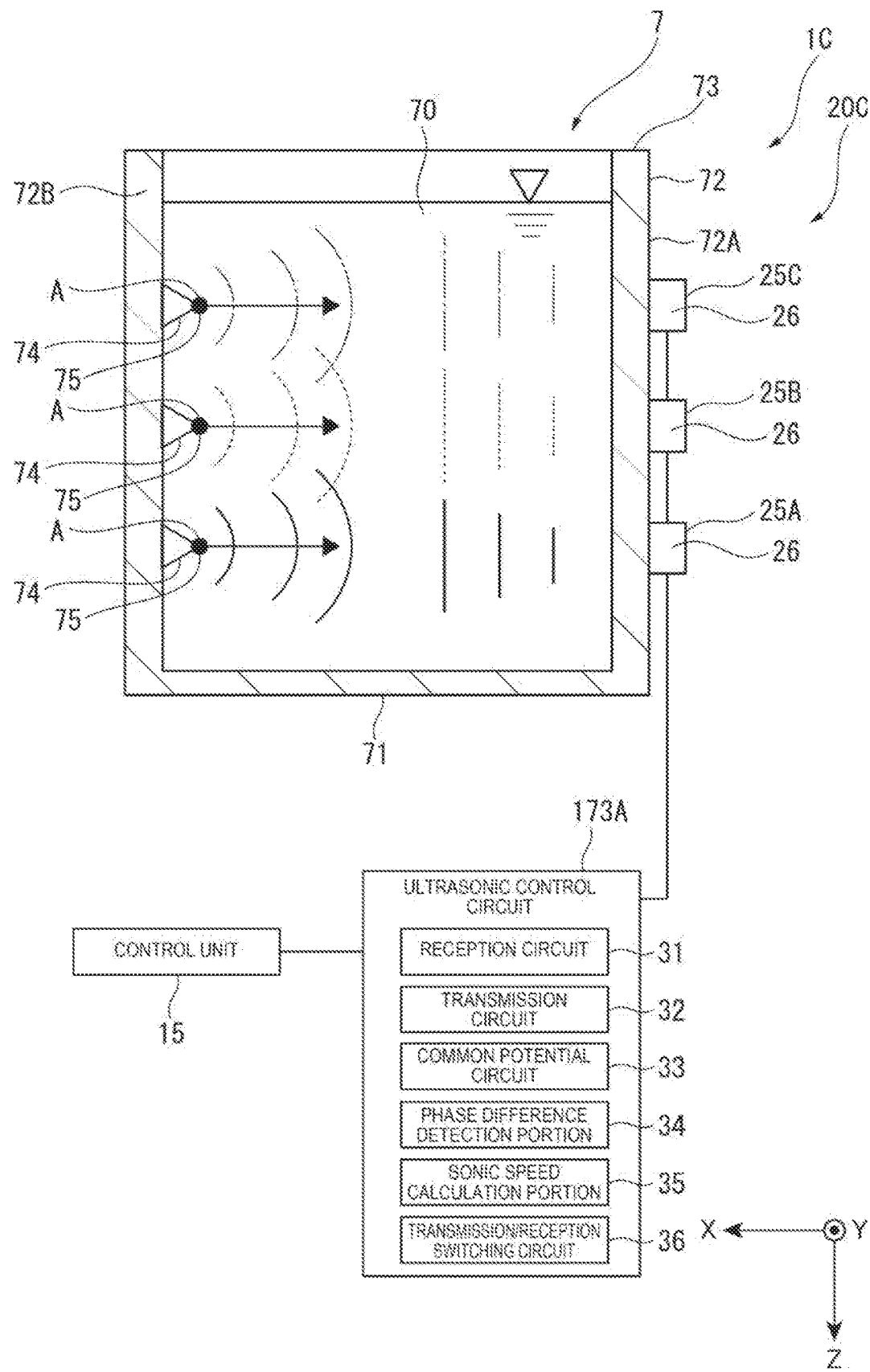
FIG. 13 is a schematic diagram illustrating a schematic sonic speed measurement device of a fourth embodiment.

FIG. 13 is a schematic diagram illustrating a schematic sonic speed measurement device 1C according to the fourth embodiment. As illustrated in FIG. 13, in the present embodiment, an ultrasonic sensor 20C includes a plurality of reception arrays 25A, 25B, and 25C which are provided at a predetermined interval in the −Z direction of being separated from the bottom surface part 71 on the first side surface part 72A. For example, the ultrasonic sensor 20C includes the lower reception array 25A disposed further toward the bottom surface part 71 side (+Z side) than the center of the first side surface part 72A in the Z direction, the central reception array 25B disposed at a central position of the first side surface part 72A in the Z direction, and the upper reception array 25C disposed further toward the top surface part 73 side (−Z side) than the center of the first side surface part 72A in the Z direction.

In the present embodiment, in the same manner as in the second embodiment, in the respective reception arrays 25A, 25B, and 25C, each ultrasonic transducer Tr functions as the transmission/reception element 26, and a plurality of transmission/reception elements 26 are disposed in an array form in the Z direction. Herein, a configuration is described in which the transmission/reception elements 26 are disposed in the Z direction, but this is only an example, and, in the same manner as in the first embodiment, there may be a configuration in which the transmission element 23 is disposed at the center of each of the reception arrays 25A, 25B, and 25C, and the reception elements 24 are disposed on the ±Z side with the transmission element 23 interposed therebetween.

In the present embodiment, in the reception arrays 25A, 25B, and 25C, frequencies of transmitted and received ultrasonic waves are different from each other. Specifically, openings 211A of the element substrates 21 configuring the reception arrays 25A, 25B, and 25C have different opening widths. Consequently, vibration frequencies in the vibration portion 212A have different values, and thus frequencies of ultrasonic waves which can be transmitted and received also have different values.

The protrusion 74 which protrudes toward the first side surface part 72A is provided at a position facing the center of each of the reception arrays 25A, 25B, and 25C on the second side surface part 72B. The protrusion 74 has the same configuration as that in the second embodiment, and the protruding tip point 75 is the target point A.

In the present embodiment, the reception arrays 25A, 25B, and 25C are provided on the first side surface part 72A at a predetermined interval in the direction of being separated from the bottom surface part 71, and the protruding tip point 75 of the protrusion 74 which is the target point A is provided at the position facing each of the reception arrays 25A, 25B, and 25C on the second side surface part 72B. Thus, in the ink cartridge 7, it is possible to measure the sonic speed c of an ultrasonic wave propagating through the ink 70 at locations disposed at a predetermined interval from the bottom surface part 71.

Here, in a case where a component of the ink 70 precipitates, the component of the ink 70 changes in a lower part of the ink cartridge 7, and thus only the sonic speed c of an ultrasonic wave propagating through the ink 70 in the lower part of the ink cartridge 7 shows an abnormal value. In this case, the abnormality may be resolved by stirring the ink 70 in the ink cartridge 7. On the other hand, in a case where the concentration of the ink 70 changes, the concentration of the ink 70 changes over the upper part, the central part, and the lower part of the ink cartridge 7, and thus the sonic speed c of an ultrasonic wave propagating through the ink 70 in each of the upper part, the central part, and the lower part of the ink cartridge 7 shows an abnormal value. In this case, it may be determined that coping such as replacement of the ink cartridge 7 is necessary. In other words, in the present embodiment, since the sonic speeds c in the upper part, the central part, and the lower part of the ink cartridge 7 can be calculated, a case where a component of the ink 70 precipitates and a case where the concentration of the ink 70 changes can be determined.

Modification Example

The invention is not limited to the above-described embodiments, and modifications, alterations, and the like within the scope of being capable of achieving the object of the invention fall within the invention.

In the above-described respective embodiments, the phase difference detection portion 34 performs phasing addition on output signals which are output from the respective reception elements 24, but is not limited thereto. For example, the phase difference detection portion 34 may calculate a phase shift amount in which an addition value is the maximum value when reception signals output from the reception elements 24 adjacent to each other are deviated by a phase shift amount and are added together, for each of a plurality of reception elements 24, and may detect a representative value of a plurality of phase shift amounts as a phase difference. Here, a representative value of phase differences may be, for example, an average value or the most frequent value of detected phase differences. According to this configuration, the phase difference detection portion 34 detects, as a phase difference, a representative value of phase shift amounts calculated such that an addition value is the maximum value for the respective reception elements 24, and thus it is possible to reduce a detection error and also to accurately calculate a sonic speed.

In the above-described respective embodiments, in the reception array 25, the respective reception elements 24 are disposed in an array form in the Z direction, but are not limited thereto. For example, the reception elements 24 may be disposed in an array form in the Y direction, and may be disposed in one direction. The reception elements 24 may be disposed in a two-dimensional array form in the Z direction and the Y direction.

In the above-described respective embodiments, a description has been made of an example in which an ultrasonic wave propagating in a spherical wave shape from the target point A is received by the reception element 24, but this is only an example.

For example, in the reception elements 24 which are arranged in the Z direction, an ultrasonic wave propagating in a circular arc shape on the ZX plane may be output from the target point A. In other words, in the first embodiment, a plurality of transmission elements 23 are disposed in the Y direction at the central position in the Z direction, and the first electrode films 221 of the transmission elements 23 arranged in the Y direction are connected to each other so as to have an identical potential.

A plurality of reception elements 24 are disposed in a two-dimensional array form in the ZY direction, and, among the reception elements 24, the reception elements 24 arranged in the Y direction are connected to each other so as to be used as a single reception channel. In other words, a plurality of reception channels are disposed in the Z direction. A reception signal may be increased by connecting the reception elements 24 configuring the reception channels in series to each other.

In this configuration, in a case where a drive signal is input to the first electrode terminals 221P of the transmission elements 23, ultrasonic waves are simultaneously output from the transmission elements 23. In this case, in a plan view (XZ plane) viewed from the Y direction, an ultrasonic wave propagating in a circular arc shape (a cylindrical shape with the Y direction as an axis) propagates in the X direction, and the ultrasonic wave initially reaches a line which passes through the target point A and is parallel to the Y direction, in the second side surface part 72B. Therefore, a reflected wave propagating in a circular arc shape is received by the reception array 25 from the line including the target point A on the XZ plane. Also in this case, the sonic speed c can be measured through the same process as in each of the embodiments.

In the above-described respective embodiments, the CPU 154 determines the concentration of the ink 70 on the basis of the sonic speed c, but is not limited thereto. For example, the CPU 154 may determine an ink component (component deterioration or an ink type) on the basis of the sonic speed c.

In the above-described respective embodiments, the ultrasonic sensors 20, 20A, 20B, and 20C are provided on the outer wall of the first side surface part 72A of the ink cartridge 7, but are not limited thereto. For example, the ultrasonic sensors 20, 20A, 20B, and 20C may be provided inside the ink cartridge 7.

In the first embodiment, the transmission element 23 is provided at the center of the reception array 25, but is not limited thereto. For example, the transmission element 23 may be provided at ends (ends on the ±Z sides) of the reception array 25.

In the second embodiment, the protrusion 74 is provided at a position facing the center of the reception array 25, but is not limited thereto. For example, the protrusion 74 may be provided at ends (ends on the ±Z sides) of the reception array 25, and may be provided on the second side surface part 72B.

In the third embodiment, the transmission element 23 is provided at a position facing the center of the reception array 25, but is not limited thereto. For example, the transmission element 23 may be provided at ends (ends on the ±Z sides) of the reception array 25, and may be provided on the second side surface part 72B.

In the above-described respective embodiments, the printer 10 has been described as an electronic apparatus to which the sonic speed measurement device 1 is applied, but this is only an example. For example, a measurement device which only measures the ink 70 in the ink cartridge 7 may be used.

In the above-described respective embodiments, a sonic speed of an ultrasonic wave propagating through the ink 70 is calculated, but is not limited thereto. For example, a sonic speed of an ultrasonic wave propagating through a solid object such as steel or a gas such as air may be calculated. In this case, the sonic speed measurement device 1 may calculate the temperature of the solid object such as steel or the pressure of the gas such as air on the basis of the sonic speed.

The entire disclosure of Japanese Patent Application No. 2018-038320, filed Mar. 5, 2018 is expressly incorporated by reference herein.

What is claimed is:

1. A sonic speed measurement device comprising:
    a reception array in which a plurality of reception elements which output reception signals in response to reception of an ultrasonic wave are arranged in one direction;
    a phase difference detection portion that detects a phase difference between the reception signals output from the reception elements adjacent to each other in a case where the plurality of reception elements receive the ultrasonic wave which propagates in a spherical wave shape from a target point; and
    a sonic speed calculation portion that calculates a sonic speed of the ultrasonic wave on the basis of the phase difference,
    wherein the phase difference detection portion calculates an addition value by deviating the reception signals output from the reception elements adjacent to each other by a predetermined phase shift amount and adding the reception signals together, and detects the phase shift amount in which the addition value is the maximum, as the phase difference.

2. An electronic apparatus comprising:
    the sonic speed measurement device according to claim 1; and
    a controller that controls the sonic speed measurement device.

3. The electronic apparatus according to claim 2, further comprising:
    a container that has a bottom surface part, a first side surface part standing on the bottom surface part, and a second side surface part standing on the bottom surface part and facing the first side surface part via a fluid, in which the reception array is provided on the first side surface part, and the target point is provided at a position facing the reception array on the second side surface part,
    wherein the controller compares the sonic speed calculated by the sonic speed calculation portion with a predetermined reference value, so as to determine the quality of the fluid.

4. A sonic speed measurement device comprising:
    a reception array in which a plurality of reception elements which output reception signals in response to reception of an ultrasonic wave are arranged in one direction;
    a phase difference detection portion that detects a phase difference between the reception signals output from the reception elements adjacent to each other in a case where the plurality of reception elements receive the ultrasonic wave which propagates in a spherical wave shape from a target point; and
    a sonic speed calculation portion that calculates a sonic speed of the ultrasonic wave on the basis of the phase difference,
    wherein, in a case where an addition value is calculated by deviating the reception signals output from the reception elements adjacent to each other by a predetermined phase shift amount and adding the reception signals together, the phase difference detection portion calculates the phase shift amount in which the addition value is the maximum, for each of the plurality of reception elements, and detects a representative value of the plurality of phase shift amounts as the phase difference.

5. An electronic apparatus comprising:
the sonic speed measurement device according to claim 4; and
a controller that controls the sonic speed measurement device.

6. A sonic speed measurement device comprising:
a reception array in which a plurality of reception elements which output reception signals in response to reception of an ultrasonic wave are arranged in one direction;
a phase difference detection portion that detects a phase difference between the reception signals output from the reception elements adjacent to each other in a case where the plurality of reception elements receive the ultrasonic wave which propagates in a spherical wave shape from a target point; and
a sonic speed calculation portion that calculates a sonic speed of the ultrasonic wave on the basis of the phase difference,
wherein the reception array is provided on a first side surface part of a container which has a bottom surface part, the first side surface part standing on the bottom surface part, and a second side surface part standing on the bottom surface part and facing the first side surface part, and is able to store a fluid in a space surrounded by the bottom surface part, the first side surface part, and the second side surface part, and
wherein the target point is provided at a position facing the reception array on the second side surface part.

7. The sonic speed measurement device according to claim 6, further comprising:
a transmission element that is provided on the first side surface part and transmits an ultrasonic wave toward the target point on the second side surface part.

8. The sonic speed measurement device according to claim 7,
wherein the transmission element is provided at the center of the reception array.

9. An electronic apparatus comprising:
the sonic speed measurement device according to claim 8; and
a controller that controls the sonic speed measurement device.

10. An electronic apparatus comprising:
the sonic speed measurement device according to claim 7, and
a controller that controls the sonic speed measurement device.

11. The sonic speed measurement device according to claim 6,
wherein the target point is a protruding tip point of a conical protrusion which protrudes toward the first side surface part from the second side surface part.

12. An electronic apparatus comprising:
the sonic speed measurement device according to claim 11; and
a controller that controls the sonic speed measurement device.

13. The sonic speed measurement device according to claim 6, further comprising:
a transmission element that is provided at the target point and outputs an ultrasonic wave propagating in a spherical wave shape.

14. An electronic apparatus comprising:
the sonic speed measurement device according to claim 13; and
a controller that controls the sonic speed measurement device.

15. The sonic speed measurement device according to claim 6,
wherein a plurality of the reception arrays are provided at a predetermined interval in a direction of being separated from the bottom surface part on the first side surface part, and
wherein the target point is provided at a position facing each of the reception arrays on the second side surface part.

16. An electronic apparatus comprising:
the sonic speed measurement device according to claim 15; and
a controller that controls the sonic speed measurement device.

17. An electronic apparatus comprising:
the sonic speed measurement device according to claim 6; and
a controller that controls the sonic speed measurement device.

* * * * *